Aug. 18, 1964  W. J. HARLEY  3,144,860
VEHICLE TRANSMISSION AND CONTROL
Filed July 28, 1961  3 Sheets-Sheet 1

INVENTOR.
WILLIAM J. HARLEY
BY
Bynrd H. Michael
ATTORNEY

INVENTOR.
WILLIAM J. HARLEY
BY
ATTORNEY

INVENTOR.
WILLIAM J. HARLEY
BY
ATTORNEY

United States Patent Office 3,144,860
Patented Aug. 18, 1964

3,144,860
VEHICLE TRANSMISSION AND CONTROL
William J. Harley, Milwaukee, Wis., assignor to Harley-Davidson Motor Co., Milwaukee, Wis., a corporation of Wisconsin
Filed July 28, 1961, Ser. No. 127,605
8 Claims. (Cl. 123—179)

This invention relates to a variable speed transmission which can act to govern the input under certain operating conditions.

Patent No. 2,986,043 shows a transmission designed for use in connection with a motor scooter or the like and employing a variable diameter sheave connected to a driven sheave by means of a V-belt. The driven sheave is spring loaded to a maximum diameter position and the drive sheave is spring loaded to a minimum diameter position while being provided with a number of balls movable outwardly to increase the effective diameter of the drive sheave as the input speed is increased with a consequent increase in centrifugal force acting on the balls. As a part of the control apparatus for the motor scooter the patent provided a selector lever having basically two positions, one being the "start" position and the other being a "run" position. In the running position the motor starter cord is locked against actuation so that the scooter cannot be started "in gear." The transmission in that patent was so connected to the selector lever that when the selector lever was moved to the "start" position a plurality of fingers or pins were moved into the path of the centrifugally operated balls to prevent them moving outwardly under influence of centrifugal force. Under this condition when the scooter was started the drive sheave was locked in its minimum diameter position and, hence, the input speed to the drive sheave could not be transmitted to the rear wheel of the motor scooter. It will be appreciated that this system apparently affords an effective safety interlock for the starting condition. One factor overlooked in such a design is that of the human element and experience has shown that in a number of cases the operator of the scooter was desirous of increasing the engine speed with the selector in the start or neutral position. This enabled the operator to produce a considerable amount of noise which for psychological reasons was rather satisfactory to some persons. From an engineering standpoint, however, the results were frequently rather disastrous in that the great increase in engine speed with no load on the engine would produce considerable centrifugal force on the balls which, of course was resisted by the pins holding the balls against outward movement. Under such circumstances it will be appreciated that something had to give, either the engine or the pins, and generally it was the pins which would be bent or sheared and permit the balls to fly outwardly and destroy the input part of the transmission.

The principal object of this invention is to improve upon the foregoing transmission to prevent application of such runaway speed conditions to the input of the transmission.

This object has been accomplished by interlocking the selector lever with the driven portion of the transmission to lock the driven portion of the transmission against rotation when the selector is in the start or neutral position. The drive portion is no longer provided with the restraining pins and is free to change the effective diameter of the drive sheave in response to input speed. This being the case, any attempt to unduly "rev up" the engine when in the start or neutral position will necessarily result in attempting to drive the output through the V-belt. Now, since the output is locked against rotation it becomes obvious that the V-belt will be subjected to considerable slippage while at the same time acting as a very effective brake on the engine and thus limiting the engine speed. About the most that can happen under these conditions is to accelerate wear of the V-belt which is an inexpensive and easily replaced part. It is extremely unlikely, however, that any damage will be done to the transmission itself and, hence, it is extremely unlikely that the operator can be injured in any way by a transmission being blown apart as was possible in connection with the prior transmission.

Other objects and advantages will be pointed out in, or be apparent from, the specification and claims, as will obvious modifications of the single embodiment shown in the drawings, in which:

Figure 1:
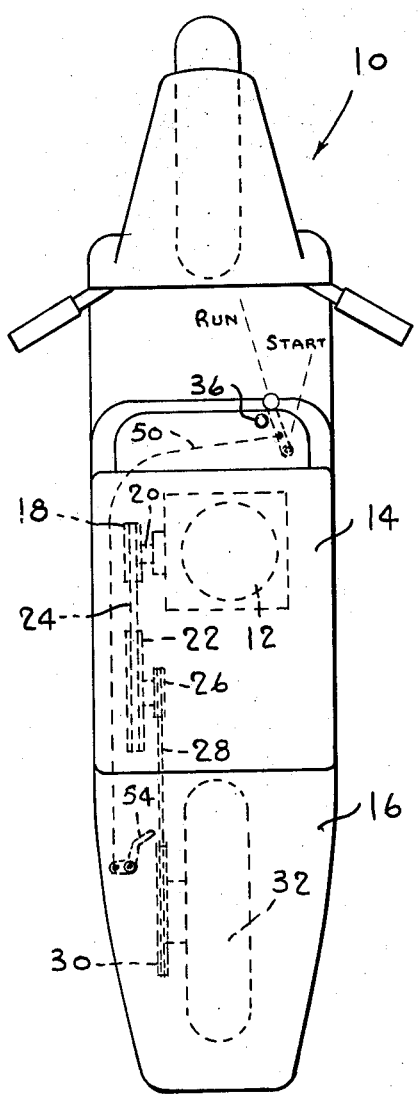
FIG. 1 is a top view of a motor scooter with the motor and transmission system shown dotted.

Referring to the drawings in detail, motor scooter 10 has an engine 12 mounted under seat 14 on top of body 16. Speed responsive variable diameter sheave 18 is mounted on the motor or engine drive shaft 20 and drives a spring loaded variable diameter driven sheave 22 to V-belt 24. The driven sheave is mounted on a jack-shaft for rotation at a speed determined by the effective diameter of the drive sheave 18. A drive sprocket 26 is connected by chain 28 to the driven sprocket 30 which in turn is connected to the rear wheel 32. The vehicle is provided with a suitable throttle control.

Figure 5:
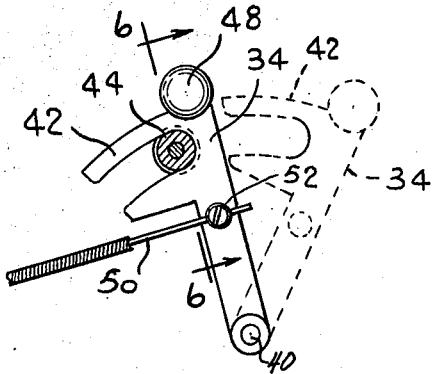
FIG. 5 is a view of the selector lever.
Figure 6:
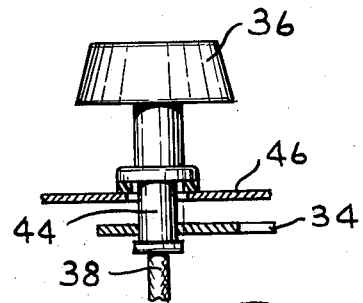
FIG. 6 is a view of the starter knob.
Figure 7:
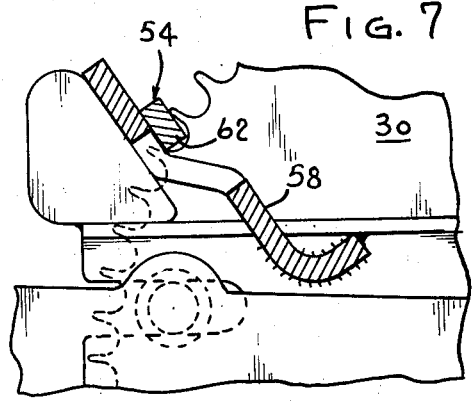
FIG. 7 is a section view of the bell crank engaged with the sprocket.

Mounted in front of and below the seat 14 is a selector lever movable between "run" position and "start" position. FIGS. 1, 5 and 6 illustrate the "run" position with the "start" position being indicated in dotted lines in FIG. 5. In the "run" position the selector lever 34 prevents actuation of the engine starter cable by preventing movement of knob 36 connected to the start cable 38. Lever 34 is pivoted at 40 and is provided with a slotted end portion 42 which, in the "run" position shown in full lines in FIG. 5, engages the reduced diameter portion 44 of the start knob below the body panel 46.

Figure 4:
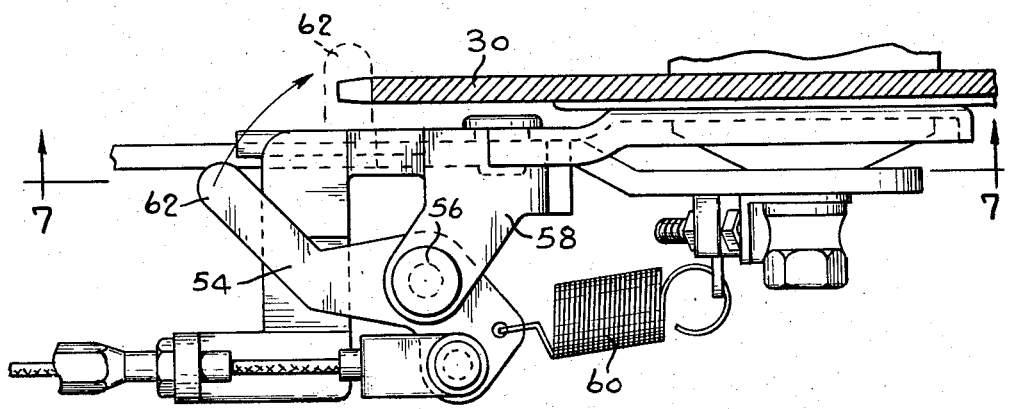
FIG. 4 is a top view of the lockout mechanism.

When the selector knob 48 is moved to move lever 34 to the "start" position as illustrated in dotted lines in FIG. 5 the slot in the selector lever is withdrawn from the reduced portion 44 of the starter knob and, hence, the knob is free to be actuated. It will be noted that push-pull cable 50 is connected to the selector lever at 52. The other end of this cable is connected to a spring loaded bell crank 54 adjacent the driven sprocket (at the rear wheel). The bell crank is pivoted at 56 on bracket 58 and is biased by spring 60 into the position shown in FIGS. 1 and 4. Movement of the selector lever to the "start" position will, however, rotate the bell crank 54 in the direction of the arrow in FIG. 4 to move the dog portion 62 of the crank into engagement with the driven sprocket 30. If the dog is not lined up with a space between the sprocket teeth there is sufficient play to permit the dog to "find" a suitable notch portion by riding down one side or the other of a tooth or it is possible to "find" the notch by rocking the scooter.

From the foregoing it will be appreciated that when the starter knob is free for actuation the rear wheel of the motor scooter is locked against rotation. Since the rear wheel is locked against rotation the drive sprocket 26 rotatable with the driven sheave 22 will also be locked against rotation and, hence, the driven sheave is locked against rotation. Therefore, in the "start" position the driven sheave is in its maximum diameter position.

Figure 2:
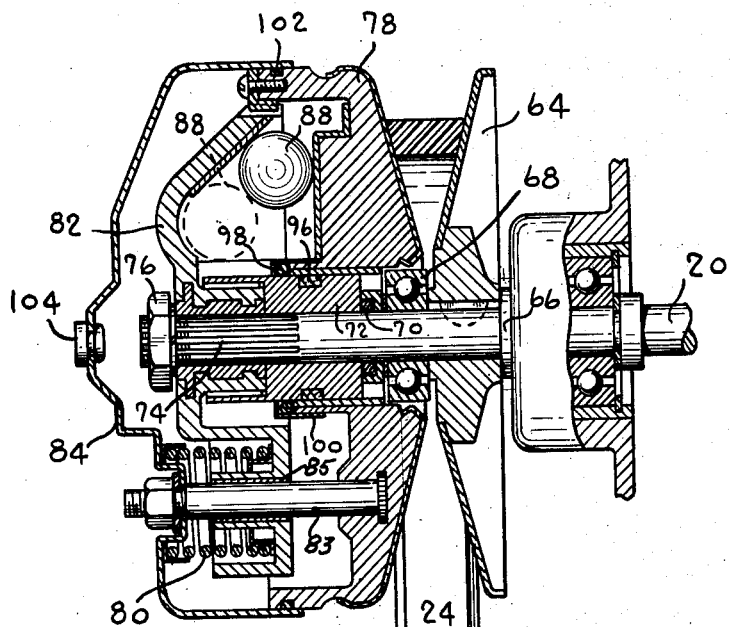
FIG. 2 is a sectional view of the variable ratio power transmission.
Figure 2:
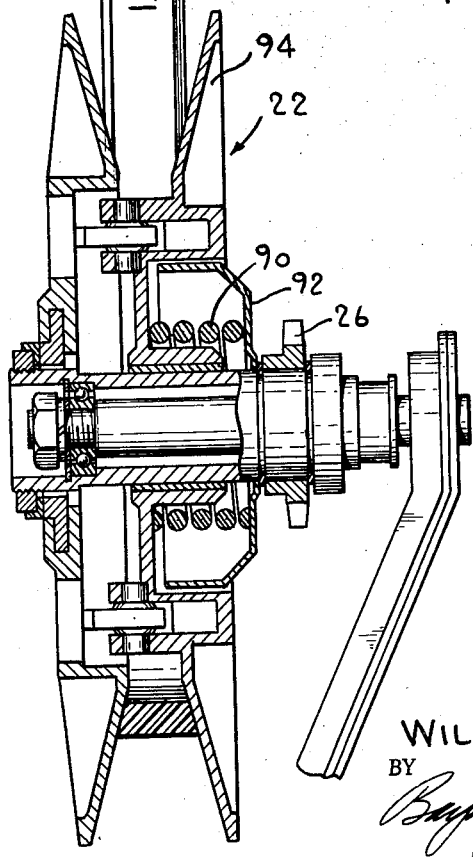
Figure 3:
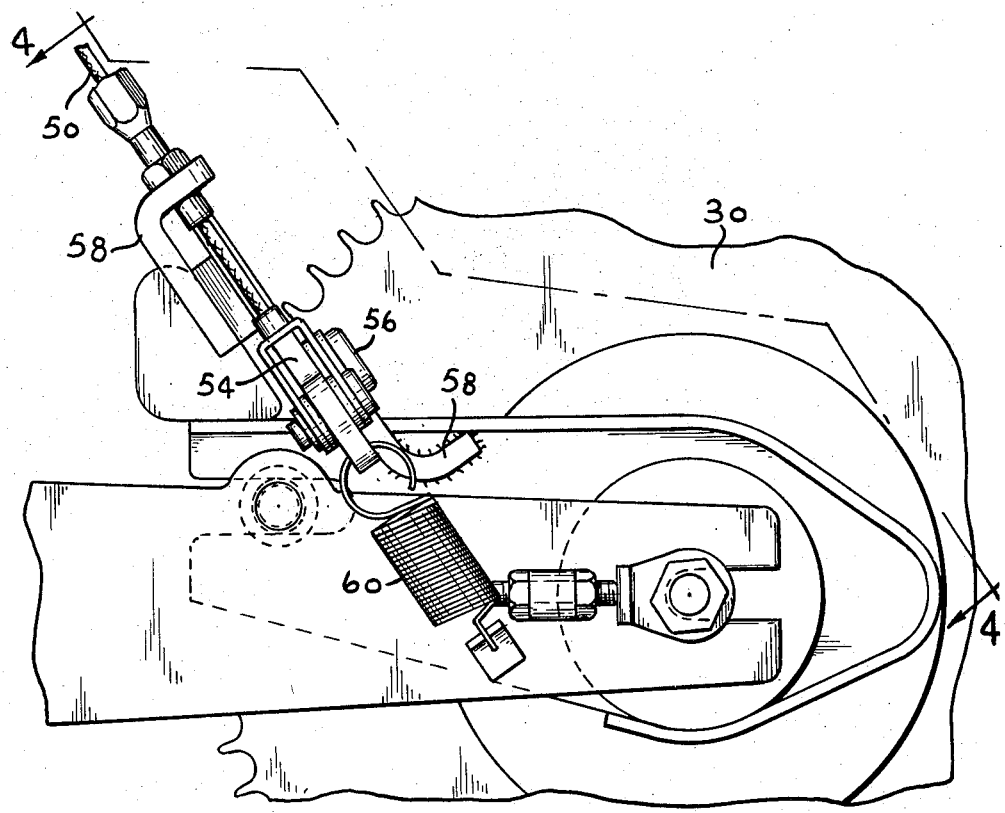
FIG. 3 is a side view of the bell crank lockout mechanism.

Going now to the details of the drive and driven sheaves, the engine drive shaft 20 has a sheave half 64 keyed thereon and fixed axially by reason of its position between shaft collar 66 and the combined assembly of the ball bearing assembly 68, O-ring shaft seal assembly 70, spacer bushing 72 and drive element 82 splined on the shaft and retained thereon by nut 76. The movable sheave half 78 slides on the bushing 72 and is biased to the left in FIG. 2 by a plurality of springs 80 compressed between drive member 82 fixed on spline 74 and the cover 84 fixed to the sheave half. The spring load on the sheave half 78 acts to move the balls 88 to their innermost position. The balls engage grooved bronze raceways on both the sheave half 78 and on the dished drive member 82. Power is transmitted from the drive member 82 to the sheave half 78 through drive pins 83 fixed in sheave half 78 and bushed in drive member 82 at 85. As the engine speed is increased centrifugal force will force the balls outwardly against the bias of springs 80 to move sheave half 78 to the right and increase the effective diameter of the drive sheave. This, of course, will cause a corresponding decrease in the diameter of the driven sheave 22 which is biased by spring 90 compressed between fixed member 92 and the movable sheave half 94. When the engine speed is low the spring load on the drive sheave will act to reduce the drive sheave diameter to a minimum with the V-belt then riding on the outer race of bearing assembly 68. This is the normal "start" condition.

In starting and idling the engine the drive sheave diameter is the minimum and there is, of course, no motion transmitted to the driven sheave. In the "start" position of the selector lever the whole output portion of the transmission is locked against motion and under these conditions it will be appreciated that increasing the engine speed will tend to increase the effective diameter of the drive sheave and start pinching the V-belt. Since the driven sheave cannot rotate there will be considerable slippage and, of course, considerable braking effect at the drive sheave. This will prevent excessive engine speed and permits use of an ungoverned engine in the motor scooter and no damage can occur in the drive sheave since the excessive slippage on the V-belt will manifest itself as damage to the V-belt and not to the drive sheave. After the operator has worn out a V-belt or so he will soon tire of attempting to "rev up" his engine for purposes of demonstration and the like.

When the selector lever is moved to the drive or run position the spring 60 acting on crank 54 will insure moving the dog out of engagement with the sprocket and the spring then acts to prevent the dog from being jarred into engagement with the sprocket. The spring acts as a safety measure should the cable break.

With the present construction and avoidance of any mechanism preventing movement of the balls under certain conditions it is now possible to provide a very effective dirt and oil seal for the drive sheave. Thus, there is the shaft seal 70 preventing leakage at this point, dust seal 96, and an O-ring 98 held in place by retainer 100. On the outside of the assembly there is an additional O-ring 102 acting between cover 84 and the movable sheave half 78 (it will be understood that there is no motion between parts 78 and 84). With such an effective seal of the assembly virtually no dirt can enter the ball raceways to shorten the life thereof. Lubricant can be added through the fill hole in the cover 84 which is normally plugged by the deformable rubber plug 104.

A further advantage of the present arrangement is that when the engine is to be started the rear wheel is locked and there is no possibility of the scooter moving (rolling) during starting.

Although but one embodiment of the present invention has been illustrated and described, it will be apparent to those skilled in the art that various changes and modifications may be made therein without departing from the spirit of the invention or from the scope of the appended claims.

I claim:
1. A safety device for an engine comprising, a transmission having a speed responsive input connected to said engine and an output means connected to said input means by a belt, start means for said engine, manually operable means having a start and a run position, and lockout means operated by the manually operable means to lock the output from rotation when the manual means is in the start position whereby an increase in engine speed of the input during starting will cause the belt to load the input and prevent excessive engine speed.

2. A device according to claim 1 wherein the output includes a sprocket and the lockout means includes a dog which is rotatable into engagement with the teeth in the sprocket.

3. A device according to claim 1 wherein, the manually operable means is operative to engage and lock the starting means in the run position and to disengage and release the starting means in the start position.

4. In a vehicle, an engine, a speed responsive and variable diameter drive sheave driven by the engine, a variable diameter sheave driven by the drive sheave by a belt, means for starting the engine, manually operable operation condition selector means movable between first and second positions, means interconnecting the starter means and the selector means in said first position to prevent operaion of the starter means in the first position, the starter means being operable in said second position, and means responsive to movement of the selector means to the first position to lock the driven sheave against rotation.

5. Apparatus according to claim 4 in which the driven sheave is connected to a wheel of the vehicle and locking the driven sheave also locks the wheel against rotation.

6. In a vehicle, an engine, an engine speed responsive transmission connected to a vehicle wheel by means including a belt, means for starting the engine, selector means operatively connected with said starting means and operative to disable and enable operation of the starting means, and means operative in response to operation of said selector means to enable said starting means to lock the wheel against rotation whereby said belt will act to govern the engine during starting.

7. In a vehicle, an engine, a variable diameter drive sheave responsive to engine speed, a driven sheave operatively connected to a wheel, a belt connecting the sheaves, the drive sheave having no effective driving engagement with the belt at low engine speed, a starter for the engine, means operatively connected with and operative to disable and enable operation of the starter, and means responsive to enabling of the starter to prevent rotation of the driven sheave whereby increasing engine speed results in belt slippage and loading of the engine.

8. Apparatus according to claim 7 in which the responsive means also prevents rotation of the wheel.

References Cited in the file of this patent
UNITED STATES PATENTS

| | | |
|---|---|---|
| 2,511,054 | Ferguson et al. | June 13, 1950 |
| 2,822,795 | Cicero et al. | Feb. 11, 1958 |
| 2,986,043 | Jaulmes | May 30, 1961 |
| 2,987,934 | Thomas | June 13, 1961 |

FOREIGN PATENTS

| | | |
|---|---|---|
| 553,573 | Germany | June 27, 1932 |